Nov. 15, 1932.　　　C. W. VAN RANST　　　1,887,666
FRONT DRIVE AUTOMOBILE
Filed May 31, 1929　　4 Sheets-Sheet 1

Inventor
Cornelius W Van Ranst
By Arthur M Nelson
Attorney.

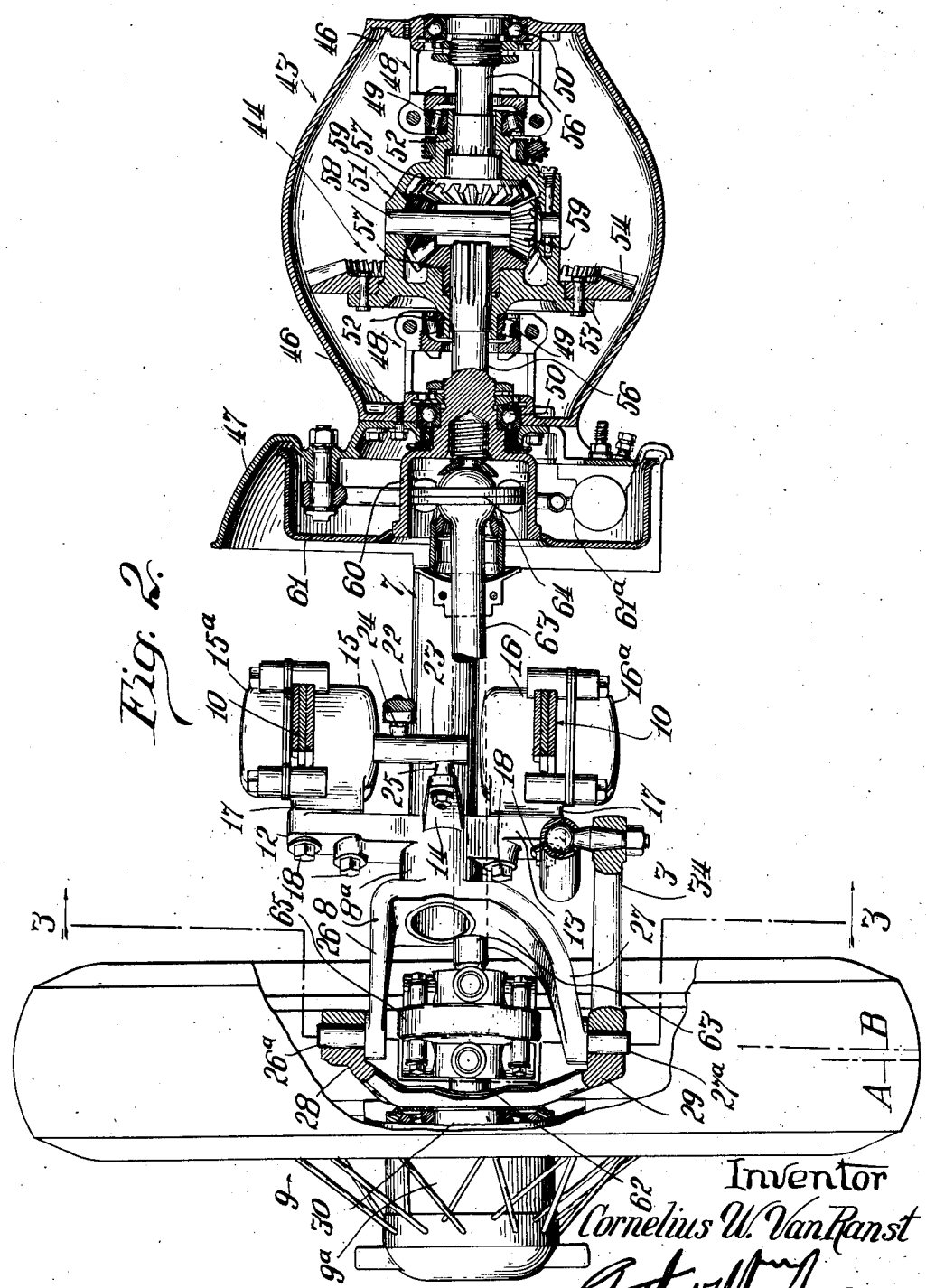

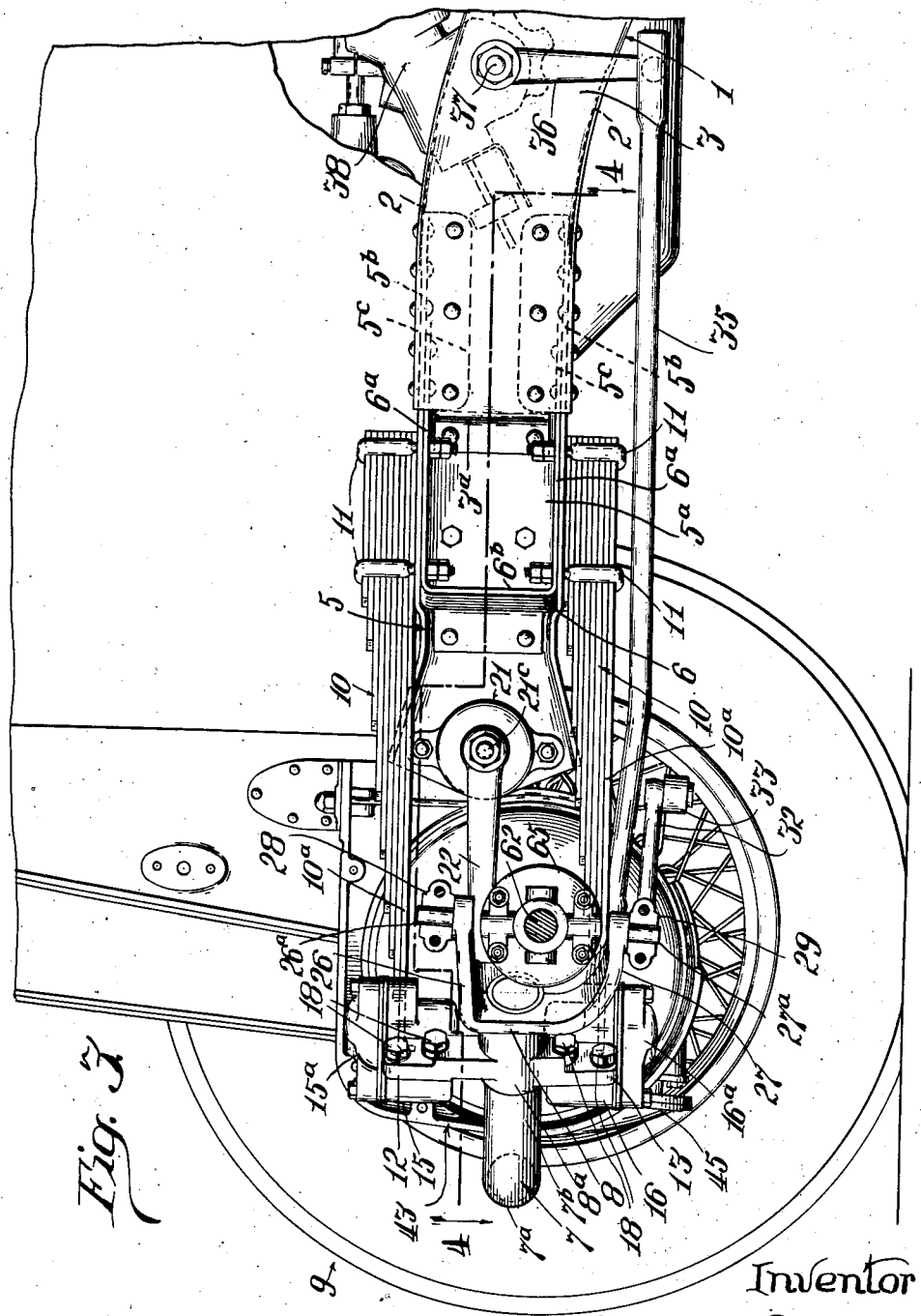

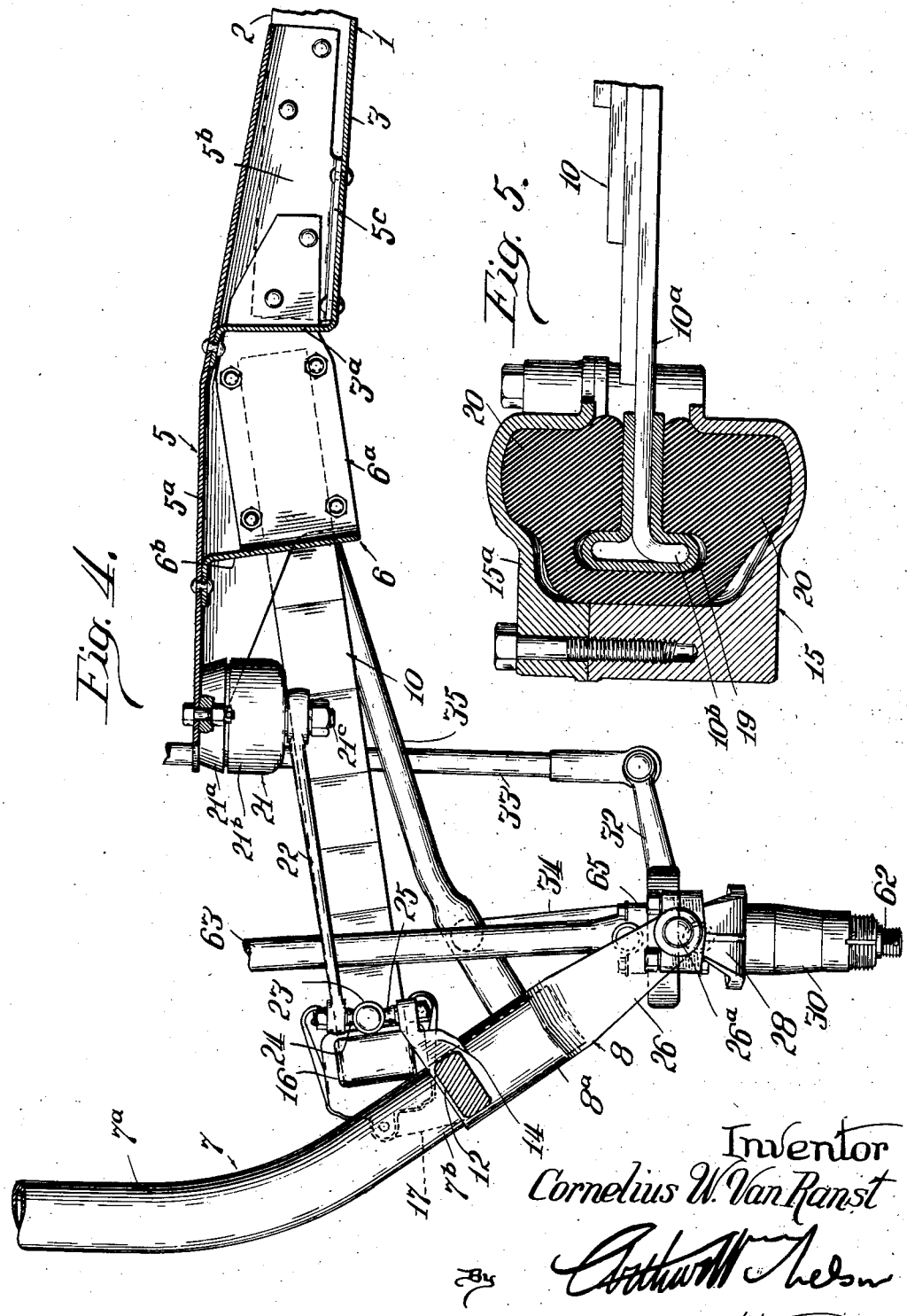

Patented Nov. 15, 1932

1,887,666

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

FRONT DRIVE AUTOMOBILE

Application filed May 31, 1929. Serial No. 367,407.

This invention relates to improvements in front drive automobiles and it consists of the matters hereinafter described and more particularly pointed out in the appended claims.

The primary object of the invention is to provide an improved construction for front drive automobiles wherein the parts employed are not only reduced in number but are so formed and correlated as to mutually cooperate in increasing the riding and driving qualities of the automobile as well as to make the same more practical for manufacture and use.

A further object of the invention is to provide an improved spring suspension and connection between the front end of the chassis frame and associated axle so as to get the pulling force as close to the wheel spindle as possible and to reduce the tendency of the axle toward deflection as well as to provide a practical connection between the chassis frame and axle for the shock absorbing devices employed.

These objects of the invention as well as others, together with the many advantages thereof, will more fully appear as I proceed with my specification.

In the drawings:

Fig. 2 is a transverse vertical sectional view through the same as taken on the line 2—2 of Fig. 1.

Fig. 3 is a view partly in side elevation and partly in section, as taken on the line 3—3 of Fig. 2.

Fig. 4 is a horizontal detail sectional view on an enlarged scale as taken on the line 4—4 of Fig. 3.

Fig. 5 is a detail vertical sectional view on an enlarged scale as taken on the line 5—5 of Fig. 1.

Figure 1:
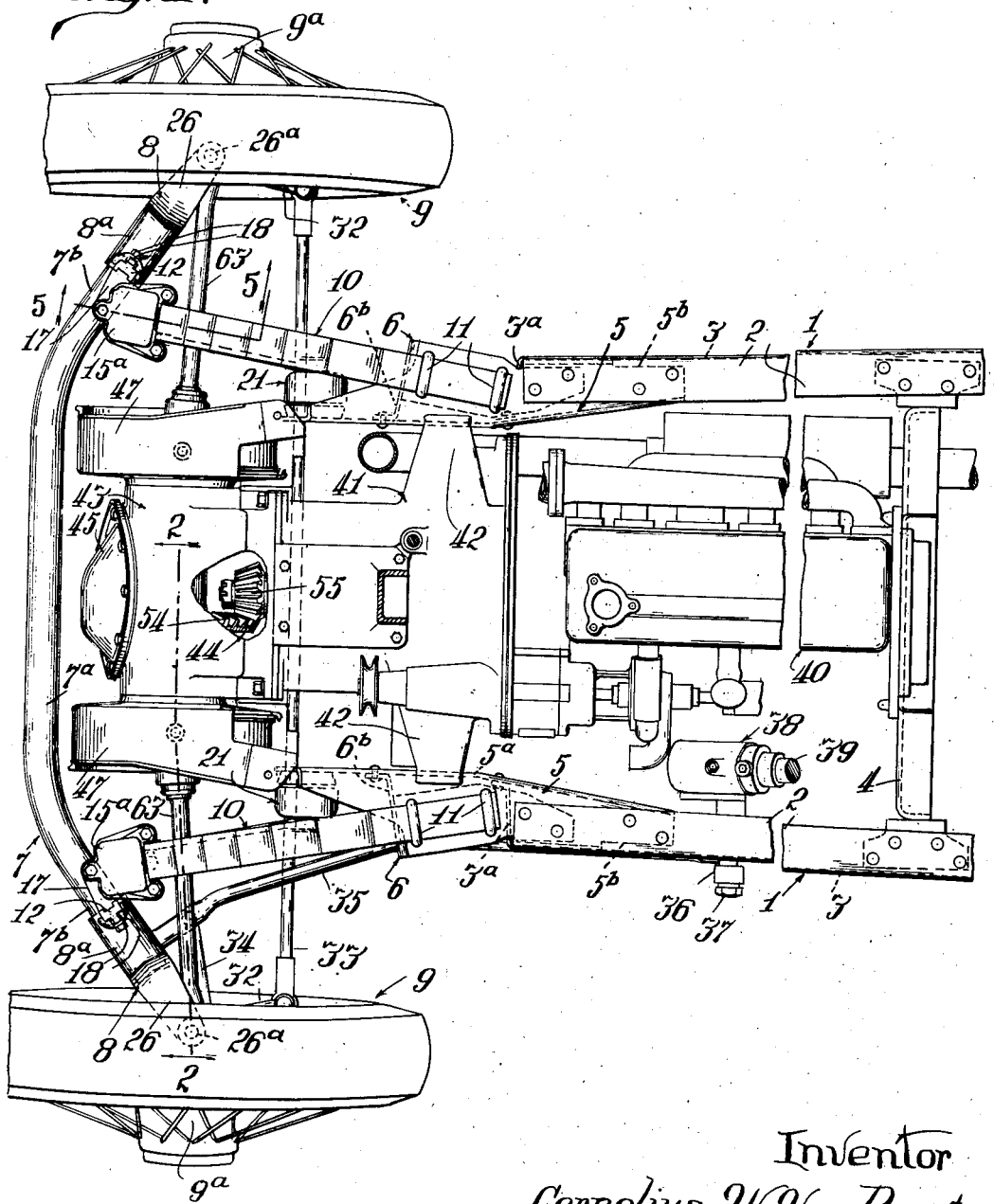
Fig. 1 is a top plan view of the front end parts of a front drive automobile embodying my invention with certain parts such as hood and radiator omitted to more fully illustrate the more salient features of the invention.

Referring now in detail to that embodiment of the invention illustrated in the accompanying drawings, 1—1 indicate the front end portions of the side frame members of the chassis, preferably made of channel stock with the top and bottom flanges 2—2 of each channel facing inwardly and with the web 3 thereto disposed perpendicularly. Said side frame members are operatively connected together a suitable distance to the rear of their front extremities by a cross member 4 as best shown in Fig. 1.

Fixed to the front end of each side frame member is an extension member 5 also of a channel cross section and including an upright web $5^a$ and top and bottom flanges $5^b$ which face outwardly. The rear end portions of the flanges $5^b$ engage within the flanges 2—2 of the associated frame member 1 and are preferably riveted thereto and each of said flanges $5^b$ include upright flange portions $5^c$—$5^c$ which engage the inner face of the web 3 of the associated frame member 1 and are preferably riveted thereto. The extreme front end of the web 3 of each side frame member is extended beyond the flanges 2—2 thereof and is bent inwardly as at $3^a$ to engage with the web $5^a$ of the extension 5 and is secured thereto, all as best shown in Fig. 4.

Associated with each extension is a bracing bracket 6 which includes top and bottom flanges $6^a$ and a transverse front end member $6^b$. The flanges $6^a$ of said bracket fit within the like flanges of the extension 5 and portions of said flanges extend rearwardly beyond the web portion $3^a$ to be secured to the flanges of the frame member 1 by some of the same rivets as secure the flanges $5^b$ thereto. The transverse front end member $6^b$ extends in toward and is secured to the web $5^a$ of the extension bracket. The front end portions of the flanges $5^b$ of each bracket tapers off in width toward the front end portion of the web $5^a$ which is flared in depth as best shown in Fig. 3 for a purpose to appear later.

7 indicates as a whole the front axle of the automobile which is preferably though not necessarily made of tubular stock. Said axle includes a transverse mid-portion $7^a$ and rearwardly inclined or deflected end portions $7^b$—$7^b$ to each of which is secured the body $8^a$ of a yoke 8 to which is operatively connected an associated front wheel 9 as will later appear.

10—10 indicate the springs of a pair of duplex supporting springs which operatively connect each side frame member of the chassis with the front axle 7. Said springs, which are of the leaf type, are so designed as to be substantially flat and horizontal when under load and the rear ends of the stack of leaves of each spring are rigidly secured to the top and bottom flanges 5ª of extension member 5 by means of pairs of U-shaped clamping bolts 11—11 as best shown in Fig. 3. In passing, it is pointed out that the main leaf 10ª of each spring is disposed at the bottom of the stack.

The springs 10—10 do not extend parallel with the side frame members as is usually the custom in automobiles but said springs diverge outwardly from said extension so that the longitudinal median line thereof intersects the deflected end portions of the axle adjacent the body of each yoke 8.

Made integral with the inner end of the body 8ª of each yoke are top and bottom perpendicularly disposed posts 12 and 13 and on the rear side of said body in the plane of the axis thereof, is a horizontally disposed, rearwardly extending stud 14 best shown in Fig. 2. The said posts provide a part of the means whereby the front end of each spring 10 is operatively connected to said axle preferably through the agency of rubber shock insulation. In this respect there is rigidly secured to each post 12 and 13, top and bottom housings 15 and 16 respectively, and associated with each housing is a cover plate 15ª and 16ª respectively. Each housing includes a lateral boss 17 having a grooved engagement with the associated post (12, 13) and bolts 18 pass through said posts into the respective bosses whereby the housings may be accurately adjusted upon said posts and then rigidly secured thereto in the desired adjusted position.

The main leaf 10ª of each spring is provided with a downturned end 10ᵇ which is engaged in a spring end bearing plate 19 located in the associated housing. Between said bearing plate and the housing and cover therefor is provided a rubber shock insulating block 20. The parts just mentioned, which are best illustrated in Fig. 5, are formed so as to absorb shock longitudinally in both directions as well as vertically in both directions and also form the means whereby the force or pull to propel the automobile is transmitted from the axle to the chassis of the automobile.

Preferably, although not necessarily so, there is also provided rebound checking devices 20 of any suitable standard type between the front end of the frame member extensions 5 and the axle 7. When such devices are desired, I secure to the front outer face of the web 5ª of each extension part, the fixed part 21ª of such a device as best shown in Figs. 3 and 4. Mounted on said fixed part is the rotatable part 21ᵇ thereof and from which the operating shaft or stud 21ᶜ extends laterally therefrom. Fixed to said shaft or stud is one end of the operating arm 22 of the rebound checking device, the other end of which is operatively connected to the top end of a vertically disposed bar 23 by a stud-bolt 24. The bottom end of this bar is operatively connected by a stud-bolt 25 with the rear end of the boss 14 on the yoke 8 before mentioned.

As best shown in Figs. 3 and 4, the arm 22 of the rebound checking device is located between the springs 10—10 and extends parallel therewith so as to be out of the way and yet coact to the best advantage with the springs to increase the riding qualities of the automobile as a whole.

Each yoke 8 includes in connection with the body 8ª a pair of vertically spaced, top and bottom yoke arms 26 and 27 respectively, the median line of which forms a continuation of the like line of the axle part 7ᵇ. The yoke arms 26 and 27 include top and bottom spindle studs 26ª and 27ª to which the like arms 28 and 29 of a tubular non-rotative wheel axle 30 are operatively engaged as best shown in Fig. 2. Journalled on said tubular axle is the hub 9ª of the wheel 9 by means of anti-friction bearings 31 as best shown in Fig. 2. It is pointed out that the tubular axle 30 is not truly horizontal but extends slightly downwardly to give the desired angular pitch to the wheel 9 mounted thereon. This wheel is preferably a wire wheel and the plane of the spindle studs 26ª—27ª is offset but a slight distance inwardly from the plane of the road engaging tread of the tire of this wheel as best indicated by the comparison lines A—B respectively in Fig. 2.

Made integral with the arm 29 of each yoke is a substantially rearwardly extending steering knuckle arm 32, both of which are operatively connected together by a drag rod or link 33. Made integral with the arm 29 of the yoke 8 associated with the left hand wheel is an inwardly extending knuckle arm 34 to which the front end of a steering arm thrust rod 35 is connected in the usual manner. The rear end of the thrust rod 35 is operatively connected to a steering arm 36 which is fixed to a shaft 37 extending laterally through the left hand frame member 1, said shaft being connected with suitable mechanism 38 on the steering post 39.

40 indicates as a whole the engine of the automobile and the rear end of said engine is secured for support to the cross bar 4. Secured to the front end of the engine is the transmission gear casing or housing 41 enclosing the usual change speed gearing (not shown) which is operatively connected up with the crank shaft of the engine. The casing 41 includes laterally extending legs 42—42 which engage upon and are secured in any suitable manner to the frame member extensions 5—5 as best shown in Fig. 1.

On the front end of the transmission casing and just to the rear of the intermediate portion 7ª of the axle 7 is secured a casing 43 containing the differential gearing indicated as a whole at 44 in Fig. 2. Said casing includes a removable cover plate 45 at the front and end walls 46—46 at each end thereof and secured to each end wall is a brake drum housing 47. In the casing 43 and spaced inwardly from the adjacent end walls thereof are retaining bosses 48 for a coned antifriction bearing 49 of the roller type and in each end wall 46 is an antifriction bearing 50 of the ball type.

51 indicates a differential gear cage having tubular end hubs 52—52 journalled in the bearings 49—49. Said cage includes an enlarged radial flange 53 at one end to which is rigidly fixed a ring gear 54. This gear meshes with and is driven by a pinion 55 disposed within the casing 43 and operatively connected to the transmission gearing within the casing 41. The ring gear is of the hypoid type and the pinion 55 is so disposed as to mesh therewith in a plane between the axis and the top peripheral portion thereof.

56—56 indicates the driven axles of shafts of the differential. The inner end of each shaft is journalled in the associated cage hub 52 and extends into said cage where it has splined thereto a differential bevel gear 57. In said cage between the gears 57—57 and extending at a right angle to the axle shafts 56—56 is a shaft 58 upon which are mounted the differential pinions 59—59 of the transmission, said pinions meshing with the gears 57—57 in the manner found in gearing of this kind.

The outer end of each shaft 56 is formed to provide a substantially bell-shaped head or cup 60 to which is secured a brake drum 61 arranged within the housing 47. On that wall of said housing secured to the associated end wall 46 of the differential casing is mounted suitable mechanism 61ª for actuating the usual shoes cooperating with the brake drum. As shown in Fig. 2 such mechanism is of the hydraulically actuated type but as it does not in itself form a particular part of the invention, it is only illustrated and described herein, generally.

Within each tubular wheel axle and operatively connected to the wheel hub 9ª so as to drive the same is a stud axle or driving spindle 62. Between each driving spindle and axle shaft 52 is a power transmitting shaft 63 for operatively driving said spindle from said shaft. The inner end of said power transmitting shaft is operatively connected by a universal joint 64 to the bell-shaped head 60 of the axle shaft 52 and this joint is such as permits a limited slip or endwise movement between said shaft and head. The outer ends of said power transmitting shaft and driving spindle are operatively connected together by a universal joint 65 of a kind having ample clearance between the yoke arms 26—27. In the outer end of the shaft 52 is suitable spring means 66 which engages the ball shaped inner end of the shaft 63 to take up end play therein.

It is here pointed out that the axial plane of the axle shafts 52 is disposed forwardly of that of the wheel spindle shaft so that the outer end of each power transmitting shaft is directed somewhat rearwardly. This is rendered possible by the deflected or angular end portions of the front axle 7 whereby more room is provided for the turning movement of the wheels.

When the ring gear 54 is being driven by the pinion 55, it will, through the cage 51 and gears and pinions 57 and 59, drive the axle shafts 56—56. Each axle shaft 56, will in turn, through the joint 64, drive the associated power transmitting shaft 63 and as said shaft 63 is connected by the universal joint 65 with the wheel spindle or axle 62, the same is so driven as to drive the associated wheel.

As before stated and as best shown in Fig. 1, the duplex front springs 10—10 diverge outwardly toward their front ends. One of the main advantages of such a construction is that the attachment of said front ends of the springs with respect to the front axle locates the pulling force on the chassis as close to the wheels as possible to reduce deflection or the tendency to deflect and provides more room for the turning of the wheels in steering.

With the axle 7 made as described, not only is better steering qualities possible but more space is provided for the differential forward of the plane of the wheel driving spindles and this permits greater effective chassis length with consequently longer body without increasing the wheel base.

While in describing the invention, I have referred to the form, arrangement and construction of the various parts thereof in detail, yet the same is to be considered merely as illustrative so that I do not wish to be limited thereto except as may be pointed out in the appended claims.

I claim as my invention:

1. In an automobile, a side frame member of channel like cross section with top and bottom flanges facing in one direction and an extension on one end of said frame member including top and bottom flanges facing in a direction opposed to but being secured to the like flanges of the frame member.

2. In an automobile, a side frame member of channel like cross section with top and bottom flanges facing in one direction, an extension on one end of said frame member including top and bottom flanges facing in a direction opposed to but being fixed to the like flanges of the side frame members and a bracing element associated with said extension between its flanges and secured at one end to the top and bottom flanges of both said extension member and frame member.

3. An automobile embodying therein an axle having top and bottom aligned posts thereon, a frame including side members terminating to the rear of said axle, a resilient shock insulating means adjustably carried by each post on said axle and top and bottom springs each operatively fixed at one end to said frame member and at the other end each operatively engaged with an associated resilient shock insulating means on said posts.

4. An automobile embodying therein an axle having top and bottom aligned posts thereon, a frame including side members terminating to the rear of said axle, a shock insulating device adjustably carried by each post in a position above and below said axle, an extension for said frame member and a pair of springs each fixed at their rear ends to said extension and each operatively engaged at their front ends to an associated shock insulating device.

5. An automobile embodying therein an axle, a wheel yoke on one end thereof including shock insulator mounting portions, a side frame member terminating to the rear of the axle, top and bottom shock insulating devices on said portions and top and bottom springs fixed at their rear ends to said frame member and operatively engaged at their front ends to said insulating devices said devices being perpendicularly adjustable with respect to the yoke.

6. An automobile embodying therein an axle, a wheel yoke on one end thereof including shock insulator mounting portions, a side frame member terminating to the rear of the axle, an extension on said side frame member, top and bottom shock insulating devices on said portions and top and bottom springs fixed at their rear ends to said extensions and operatively engaged at their front ends with said insulating devices said devices being perpendicularly adjustable with respect to the yoke.

7. An automobile embodying therein an axle, side frame members terminating to the rear of the axle, an extension on each side frame member formed to provide top and bottom spring seats, and top and bottom springs each fixed at one end to an associated seat on said extension in advance of the side frame member and diverging outwardly therefrom and each operatively engaged at the other end with said axle said springs operating in parallel relation to hold the axle against tilting in the relative movement between said axle and side frame members.

8. An automobile embodying therein an axle, side frame members terminating to the rear of the axle, an extension including an upright web and laterally extending flanges on each side frame member, and a pair of top and bottom springs fixed at one end to said flanges of said extension in advance of the side frame member and diverging outwardly therefrom and operatively engaged at their other ends with said axle said springs operating in parallel relation to hold the axle against tilting in the relative movement between said axle and side frame members.

9. An automobile embodying therein an axle, a frame including a channel bar side member with top and bottom flanges facing in one direction and terminating short of said axle, a channel like extension having top and bottom flanges engaged with like flanges of said side member, a bracket disposed within and connecting said side member and extension together, a pair of coacting top and bottom leaf springs engaged at one end with like flanges of said extensions, means engaged with said extension flanges and portions of said bracket for securing said ends of the springs in place and means operatively connecting the other ends of said springs to said axle.

10. In an automobile a front axle comprising a cylindrical member having rearwardly deflected ends, a wheel receiving yoke including a tubular body secured to each extremity of said ends and a pair of wheel spindle receiving arms, there being top and bottom posts on each yoke body adapted for the support of housings containing shock insulators for associated springs.

11. In an automobile, a front axle, a side frame member of channel like cross section with top and bottom flanges facing in one direction, an extension on one end of said side frame member including top and bottom flanges facing in a direction opposed to but being secured to the like flanges of the frame member and top and bottom springs each fixed at one end to the outer surface of the flanges of said extensions and each operatively connected at the other end to said axle.

In testimony whereof, I have hereunto set my hand, this 28 day of May, 1929.

CORNELIUS W. VAN RANST.